United States Patent [19]

Thigpen et al.

[11] 4,314,363
[45] Feb. 2, 1982

[54] MARINE SEISMIC CABLE HANDLER

[75] Inventors: Ben B. Thigpen; Joel J. Hebert, both of Houston, Tex.

[73] Assignee: Western Geophysical Company of America, Houston, Tex.

[21] Appl. No.: 162,865

[22] Filed: Jun. 25, 1980

[51] Int. Cl.³ .............................................. G01V 1/38
[52] U.S. Cl. ..................................... 367/16; 367/106; 367/130; 181/112; 114/244
[58] Field of Search ...................... 367/15, 16, 19, 106, 367/130; 181/110, 112, 402; 114/244, 247

[56] References Cited

U.S. PATENT DOCUMENTS

| 2,627,930 | 2/1953 | Woods | 114/244 |
| 2,729,300 | 1/1956 | Paslay et al. | 181/110 |
| 3,281,767 | 10/1966 | Cryar | 367/16 |
| 3,286,225 | 11/1966 | Huckabay et al. | 367/23 |
| 3,359,536 | 12/1967 | Coburn | 367/16 |
| 3,921,755 | 11/1975 | Thigpen | 181/122 |

Primary Examiner—Nelson Moskowitz
Attorney, Agent, or Firm—William A. Knox

[57] ABSTRACT

A hydraulically-powered yo-yo reel for handling a marine seismic cable in shallow water. At the beginning of a recording episode, a partially reeled-in seismic cable is released to drift to a standstill behind a ship. Data are recorded. The cable is then accelerated to match the ships's velocity. Following the initial acceleration, the cable is superaccelerated as it is partially reeled in. A microprocessor adjusts a dwell time between recording episodes to compensate for small variations in the ship's velocity.

6 Claims, 6 Drawing Figures

- $t_0$ — FREE WHEEL
  - 10 SECONDS
- $t_1$ — DELAY TO STABILIZE CABLE
  - 2 SECONDS
- $t_3$ — FIRE SOURCE, BEGIN RECORDING CYCLE
  - 6 SECONDS
- $t_4$ — LOCK REEL, ACCELERATE CABLE
  - 3 SECONDS
- $t_5$ — REEL IN CYCLE, SUPERACCELERATE CABLE
  - 13 SECONDS
- $t_6$ — LOCK REEL, DECELERATE CABLE
  - ADJUSTABLE DWELL
- $t_0$ — FREE WHEEL

MARINE SEISMIC CABLE HANDLER

BACKGROUND OF THE INVENTION

1. Technical Field of the Invention

This invention is concerned with an apparatus for automatically paying out and retracting a marine seismic cable in alternate cycles.

2. Discussion of the Prior Art

In marine seismic surveying, a ship tows through the water along a line of survey, a streamer cable containing a plurality of hydrophones and a corresponding plurality of electrical conductors. Periodically, as the ship occupies each designated recording station, a sound source is fired to generate acoustic waves. The generated acoustic waves propagate downwardly through the water and into underground rock layers. Reflected from the rock layers, the acoustic waves return to the water surface where they are detected by the hydrophones. The detected signals are transmitted to and processed by suitable recording equipment.

In relatively deep water the streamer cable is towed continuously at a desired depth, usually in the range of 50 to 70 feet. At that depth, even though the streamer cable is continuously towed at a speed of six knots or more, the towing-noise level is tolerably low. The streamer cable is held at a substantially constant depth by means of pressure-activated hydrofoils or "birds". The above operational mode is defined as a continuous tow.

In very shallow water it is not practical to use the pressure-activated hydrofoils. The streamer cable is held at a constant depth by suspending it from surface bouys or other means. Under tow, the surface buoys and their associated tether lines generate an intolerable amount of noise. Accordingly when data are to be recorded by the hydrophones, the cable must lie substantially at a standstill. It is impractical, too time-consuming, and too uneconomical to stop the towing ship each time that data are to be recorded. Hence, means are provided for first reeling in part of the cable. When a data recording is to be made, the cable is released, unreels, drifts and so becomes substantially stationary in the water while the towing ship continues on its way. At the end of the recording period, the cable is again partly reeled in and the free-wheeling cycle is repeated after the fashion of a yo-yo. This operational mode is defined as an intermittent tow.

There are some known systems for implementing an intermittent towing operation. In U.S. Pat. No. 3,281,767 to Cryar, two cable-connected or hydrophones are used, one on each side of the stern of the towing ship. One cable is reeled in while the other cable is reeled out at a rate comparable to the ship's speed. Two winches, driven by electric motors are employed. By means of clutches and a gear-and-sprocket arrangement, the cable reels are reversable so as to alternately deploy one hydrophone cable and then the other hydrophone cable during successive data recording cycles.

U.S. Pat. No. 3,286,225 to Huckabay et al employs a single streamer cable. In this patent an engine continuously drives a differential having two output shafts. A first output shaft is coupled to a cable drum; a second output shaft is asssociated with a brake. To reel in the cable, the brake is applied to the second output shaft, whereupon the first shaft rotates, in accordance with well-known mechanical principles, to reel in the cable. To pay out the cable, the brake is released from the second output shaft so that the drum attached to the first shaft free-wheels, allowing the cable to drift behind the towing ship.

U.S. Pat. No. 3,359,536 to Coburn employs two streamer cables as does Cryar although Coburn does not disclose in detail the mechanization of his cable reels. The '536 patent is directed primarily to use of automatic drogues to decelerate the cable motion after release of a towing force by a winch.

In all three references, the apparatus is constrained to operate only in the intermittent towing mode. The cable(s) is continuously moving back and forth relative to the ship without pause. No provision is made to lock the cable winch or drum to operate in the continuous tow mode. Accordingly the use of those systems is restricted to shallow water work. The systems are not usable for general-purpose operations.

SUMMARY OF THE INVENTION

It is an object of this invention to provide an improved, versatile seismic streamer cable handling apparatus that is adaptable to either shallow or deep water operations without modification of the apparatus.

In a preferred embodiment of this invention, a hydraulically-driven cable reel is provided. A first hydraulic control causes the reel to pay out or to reel in a seismic streamer cable using a positive reel-drive mode. A second hydraulic-control arrangement is provided to pay out the cable in a free-wheeling mode and to reel the cable in, in positive reel-drive mode. A third hydraulic control is provided to lock the cable reel. Means, such as a microprocessor are provided for automatic synchronization of cable deployment-retraction cycles with data-recording cycles.

In accordance with an aspect of this invention, means are provided to decelerate the motion of a streamer cable just prior to a recording cycle. At the end of a recording cycle, means are provided to accelerate the cable to match the ship's velocity prior to reel-in and to decelerate the cable to match the velocity of the ship at the end of the reel-in cycle.

In accordance with another aspect of this invention, means are provided for applying a vernier adjustment to the timing of the deployment-retraction cycles to compensate for small variations in ship's velocity.

DETAILED DESCRIPTION OF THE PREFERRED EMBODIMENT

Figure 1:
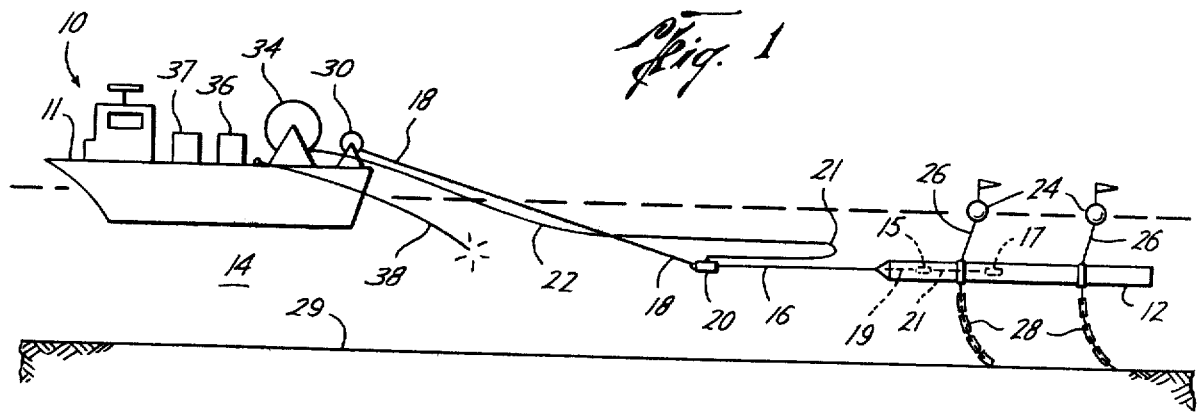
FIG. 1 shows a side view of the principal features of this invention.
Figure 2:
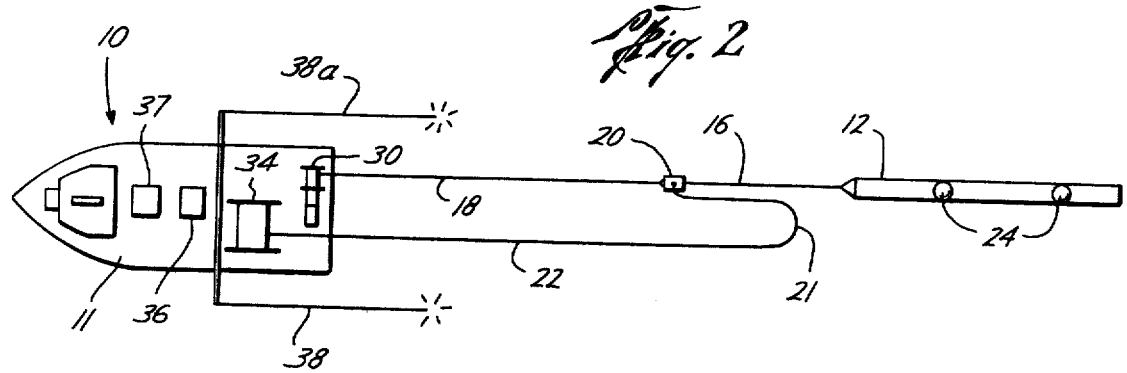
FIG. 2 is a plain view of the showing of FIG. 1.

Referring now to FIGS. 1 and 2, a ship 10, having a deck 11, tows a seismic streamer cable 12 through a body of water 14 by tow lines 16, 18 through towing link 20. Streamer cable 12 includes hydrophones such as 15, 17, for detecting seismic signals and electrical conductors 19, 21 for transmitting the detected signals to the ship. Tow line 16 includes a stress member and electrical conductors for transmission of seismic signals from streamer cable 12. Tow line 18 consists only of a stress member. The electrical conductors associated with tow line 16 are separated therefrom at towing link 20 and are separately secured to ship 10 by slack-line lead-in cable 22.

Streamer cable 12 is maintained at a desired depth by suspending it from bouys 24 on tether lines 26. Weights, in the form of short chains 28, may be attached to streamer cable 12. As shown in FIG. 1, the chains may be arranged to drag on the water bottom 29 in order to rapidly bring the cable to a standstill when tow line 18 is slacked off as will be discussed below.

Streamer cable 12 is alternately payed out and reeled in by a yo-yo reel 30 in conjunction with tow-line 18. Reel 30 is hydraulically powered and its operation is programmed by hydraulic power supply 32.

A separate cable storage reel 34 is provided. When not in service, tow line 16 is disconnected from tow line 18. Slack-line 22, tow line 16 and streamer cable 12 are all wound up on storage reel 34. Tow line 18 is of course, stored on yo-yo reel 30.

Seismic signals detected by the hydrophones in streamer cable 12 are transmitted by the electrical conductors in streamer cable 12, tow line 16 and slack-line lead-in cable 22 to a recording system 36. Recording system 36 receives the seismic signals, processes them and records them on an archival storage medium such as a magnetic tape.

One or more marine seismic sound sources 38, 38a of any conventional type are towed in the water behind ship 10. The sources are fired periodically to generate seismic waves as the ship occupies designated recording stations. The ship may be held on course and the recording stations marked by an automated navigation system 37. One such system is discussed in U.S. Pat. No. 4,138,657, assigned to the assignee of this invention.

As discussed earlier, it is preferable that ship 10 proceed along a designated course at constant velocity. But the noise created by the bouys 24 and tether lines 26 is intolerable when streamer cable 12 is in motion, Accordingly, each time a seismic data recording is to be made, streamer cable 12 is decelerated substantially to a standstill by paying out tow line 18 from yo-yo reel 30. At the end of a data recording cycle, tow line 18 is reeled back in.

In a typical operation tow line 18 is initially partially reeled in. With tow line 18 partially reeled in, slack line 22 is doubled back on itself in a half-loop 21 as in FIG. 2. Just before the sound source is fired and a recording cycle is begun, yo-yo reel 30 is released to a free-wheeling mode. As ship 10 moves ahead, streamer cable 12 quickly decelerates to a standstill in the water because of the drag of bouys 24 and ballast weights 28. The source is fired and a recording cycle begins. A recording cycle is defined to mean the acts of generating a seismic impulse and then detecting and recording the resultant seismic signals. At the end of a recording cycle of about 6 seconds, reel 30 is locked. Streamer cable 12 is now accelerated to match the ship's velocity. Reel 30 is then unlocked and is programmed to reel in a sufficient length of tow line 18 whereupon reel 30 is locked for a short dwell time to allow streamer cable to stabilize and decelerate to ship's velocity. The above sequence of events is defined as a recording episode.

Modern seismic streamer cables may stretch as much as two miles behind the towing ship. Under tow, the towing tension is several thousand pounds. Therefore, gradual cable acceleration at the end of the recording cycle is very important for this reason. At the end of a recording cycle, the velocity of the cable relative to the water is 0 knot but relative to the ship, the velocity is 2 knots. During reel-in, the cable velocity relative to the ship is more than 2 knots; relative to the water, the cable velocity would then be more than 4 knots. If reel-in is begun immediately after the end of a recording cycle as is taught by the above cited references, with the cable at a dead standstill, an initial snatching force proportional to a relative velocity of at least 4 knots would be applied to the cable. The resulting jerk will catastrophically snap the streamer cable because of the inertia of the cable when at rest in the water. Accordingly, at the end of a recording cycle, for two or three seconds reel 30 is locked to accelerate the cable to match the ship's velocity of about 2 knots. Thereafter, the cable can be safely superaccelerated to the reel-in closing velocity of about four knots relative to the water and two knots relative to ship 10.

Figure 3:
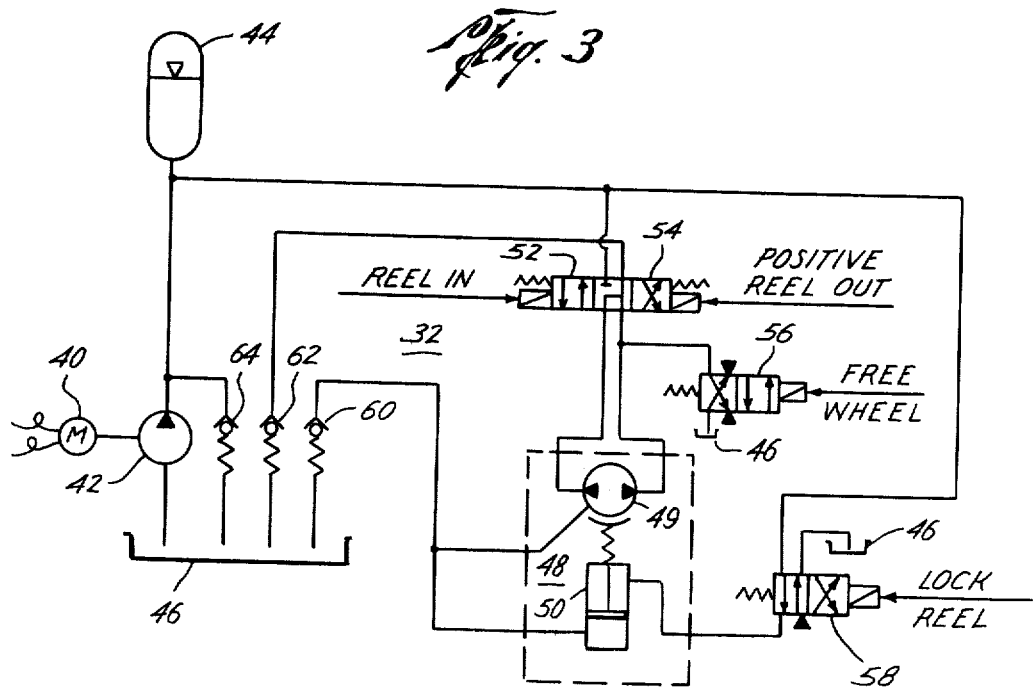
FIG. 3 is a schematic diagram of the hydraulic system.
Figure 4:
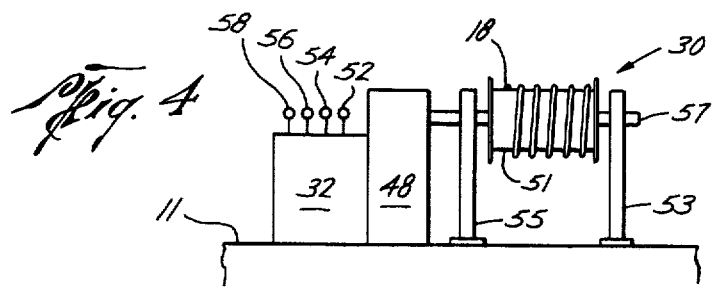
FIG. 4 shows a hydraulic motor coupled to a yo-yo reel.

Referring now to FIG. 3 and 4 there is shown schematically the hydraulic power supply and control circuit 32 for operating yo-yo reel 30. Hydraulic power is provided by an electric motor 40 which drives hydraulic pump 42. An accumulator 44 and hydraulic fluid tank or sump 46 are provided. In an exemplary system, motor 40 is a 220 V, 3-phase, 25 hp unit with pump 42 having comparable hydraulic capacity. Accumulator 44 has a 20-gallon capacity at 2000 psi and tank 46 has a capacity of 50 gallons.

Reel 30, FIG. 4, secured to deck 11 of ship 10, is powered by a high-torque, low-speed hydraulic motor 48 which includes an internal hydraulic, spring-loaded brake 50. The reel includes a drum 51, mounted on suitable supports 53, 55 by a shaft 57. The drum has a capacity for about 200 feet of ½" stainless steel cable that makes up tow line 18.

The controls, FIGS. 3 and 4, for driving reel 30 include reel-in, reel-out solenoid spool valve 54, free-wheeling solenoid valve 56 and lock-reel solenoid valve 58. The usual non-return drain-line check valves 60, 62, 64 complete the hydraulic circuit. As shown in FIG. 4, the solenoid valves may include levers for manual override.

At startup, the system operates as follows: All solenoid valves are positioned as shown in FIG. 3 at start-up time. Brake 50 is spring loaded. Thus, brake 50 is always set unless hydraulic pressure is applied to brake cylinder 50. Accordingly in the event of an electrical or hydraulic power failure or if a panic button is pressed, motor 48 immediately is locked. With motor 48 locked, electric motor 40 is started and pump 42 charges accumulator 44 to operating pressure.

For the reel-in mode, solenoid valve 52 is actuated to the left to apply hydraulic power to motor 48 from pump 42 and accumulator 44.

Motor 48 and reel 30 are allowed to free-wheel by actuating solenoid valve 56. In this mode, pressure is released from both sides of motor 48. During free-wheel mode, pump 42 is blocked and accumulator 44 is recharged.

Positive-drive reel-out mode is controlled by actuating solenoid valve 54 to the right. Positive-drive reel-out allows tow line 18 to be payed out under positive control rather than in the free-wheeling mode. Positive-drive pay-out is useful during initial deployment of the streamer cable and for maintenance.

Figure 5:
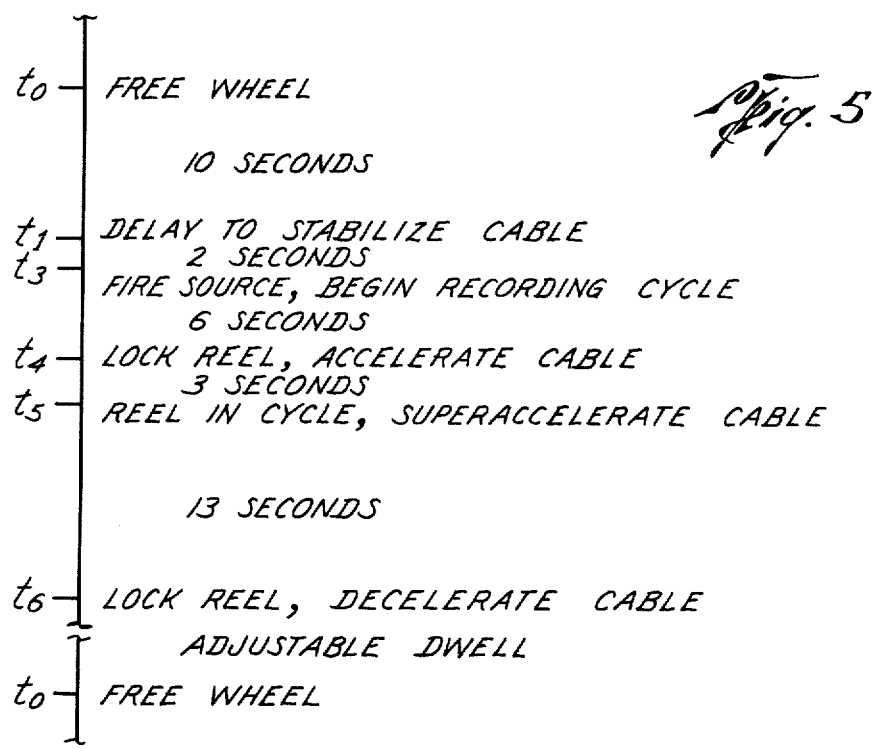
FIG. 5 is a diagram of the sequence of events during a recording episode.

An exemplary timing diagram of the sequence of events during one complete recording episode is shown in FIG. 5. At time $t_0$, reel 30 is set to free-wheel for 10 seconds. Following a further two-second stabilizing delay, sound source 38 is fired and at $t_3$ a recording cycle begins. At the end of six seconds, data recording terminates. At $t_4$, reel 30 is locked and the streamer cable is accelerated for about 3 seconds. At $t_5$, after the cable velocity matches ship's velocity, a reel-in cycle begins to superaccelerate the cable. At the end of 13 seconds, reel-in is complete and reel 30 is locked at time $t_6$, ready for another recording episode.

At $t_6$, a short dwell period of undefined length begins. There are several reasons for the dwell period at the end of reel-in time. At the end of reel-in, the inertial torque of the rotating machinery is such that rotation must be stopped before rotation in the opposite direction can be made. Additionally, the short dwell period following $t_6$ allows accumulator to become fully recharged after reel-in. Finally, and most importantly adjustment of the $t_6$ dwell period allows the operator to make vernier adjustments in the time interval between recording episodes to compensate for small variations in ship velocity due to unpredictable, random wind and water currents.

Figure 6:
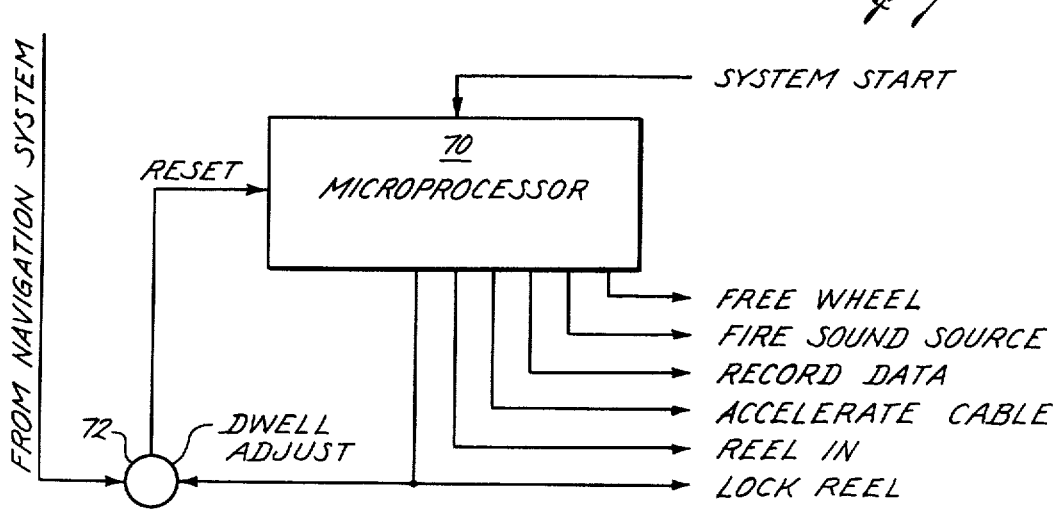
FIG. 6 illustrates a microprocessor for sequencing the events shown in FIG. 5.

Synchronization and sequencing of the functions of cable manipulation, firing of the sound source, data recording, and the like, is conveniently accomplished by means of a microprocessor 70 of any well-known type, FIG. 6. The microprocessor is programmed to implement the timing diagram of FIG. 5. Microprocessor 70 may be interconnected with navigation system 37.

As previously pointed out, wind and water currents can generate small, random, unavoidable variations in the ship's velocity. The term "small" is here defined to mean velocity variations on the order of a few tenths of a knot greater or less than a desired base velocity. The base velocity is of course controlled by the ship's throttles which remain at a constant setting. By interposing an adjustable dwell time between successive recording episodes, the operator can make vernier adjustments to lengthen or shorten the time spacing between recording episodes depending on whether the ship is running slightly slow or slightly fast. The dwell time can be operator-adjustable by a suitable dwell-adjust timer 72 or preferably it may be adjusted by the microprocessor 70 in accordance with navigation information supplied by navigation system 37.

As a numerical example, assume a recording station spacing of 110 feet and a ship's velocity of 1.7 knots or 2.84 feet per second. Between time $t_0$, the beginning of a recording episode, and $t_4$, the end of a recording cycle, ship 10 travels 51.12 feet and approximately that length of tow line 18 will have been payed out. Reel 30 is locked for 3 seconds to accelerate streamer cable 12 and 13 seconds will be consumed during reel-in. During those periods, the ship will have travelled another 45.44 feet or a total of 96.56 feet between times $t_0$ and $t_6$ when reel 30 is again locked. Since the ship must travel another 13.44 feet to reach the next assigned recording station that is 110 feet from the previous station, the dwell time will be 4.7 seconds before the next recording episode begins. Had the ship been sailing a bit faster, the dwell time would have been shortened.

For operating in the continuous tow mode, bouys 24 and ballast weights 28 are replaced by hydrofoils. The cable is payed out as required and winch 30 is locked. The system can thus be readily adapted from the intermittent operating mode to a continuous tow mode without altering the cable-handling machinery.

Many variations may be made in the exemplary system as described supra without departing from the spirit and scope of this invention which is limited only by the appended claims.

We claim as our invention:

1. An improved dual-purpose cable handler for manipulating a seismic-signal detector streamer cable towed through a body of water by a ship sailing at a desired base velocity, the ship including a sound source for generating seismic impulses and a recorder for processing seismic signals received by the detector streamer cable during a recording cycle, the improvement comprising:
   means for operating the cable handler in an intermittent towing mode including:
   a. means for decelerating said detector streamer cable substantially to a standstill;
   b. means for initiating a recording cycle;
   c. means for accelerating said detector streamer cable, at the end of the recording cycle, to match the ship's velocity;
   d. means for establishing a cable reel-in cycle;
   e. means for decelerating said detector streamer cable upon completion of the reel-in cycle;
   means for time-sequencing the operations of means a. through e. during a recording episode; and
   means for applying, between successive recording episodes, a vernier compensation for small velocity variations relative to a desired base velocity.

2. The improved cable handler as defined by claim 1 wherein the vernier compensating means includes:
   means for interposing a desired dwell time between successive recording episodes.

3. The improved cable handler as defined by claim 2 further comprising:
   a microprocessor for sequencing the operational events taking place during a recording episode; and
   an automated navigation system associated with said microprocessor for interposing the desired dwell time between successive recording cycles.

4. The improved cable handler as defined in claim 1 comprising:
   means for switching the cable handler from the intermittent towing mode to a continuous towing mode.

5. A method for manipulating a marine seismic-detector streamer cable, towed behind a ship at a desired base velocity, during successive recording episodes, comprising the steps of:
   decelerating said cable substantially to a standstill;
   recording seismic data;
   accelerating said seismic cable to match the ship's velocity;
   superaccelerating said seismic cable relative to the water;
   decelerating said seismic cable to match the ship's velocity; and
   interposing a desired dwell time between successive recording episodes to furnish a vernier compensation for small changes in the ship's velocity relative to the base velocity.

6. An improved cable handler for manipulating, during a recording episode, a marine seismic detector cable towed behind a ship at a desired base velocity, the ship including means for generating a seismic impulse and means for recording seismic signals during a recording cycle, the improvement comprising:

a reversible, hydraulically powered cable reel and a tow line for coupling the streamer cable to said reel;

a hydraulic control circuit for selectively programming the reel to operate in a reel-in mode, a positive reel-out mode, a free-wheeling mode and a lock-reel mode;

a microprocessor, interconnected with the hydraulic control circuit, the seismic impulse generating means and the seismic signal recording means, for establishing a recording episode by sequentially setting the cable reel to the free-wheeling mode to decelerate the detector cable, initiating a recording cycle, setting the cable reel to the lock-reel mode to accelerate the detector cable, setting the cable reel to the reel-in mode to superaccelerate the detector cable, and setting the cable reel to the lock-reel mode to decelerate and stabilize the detector cable; and an automated navigation system coupled to the microprocessor for interposing a desired dwell time between the end of a first recording episode and the beginning of another recording episode to provide vernier compensation for small variations in the ship's velocity relative to the base velocity.

* * * * *